US005494759A

United States Patent [19]

Williams et al.

[11] Patent Number: 5,494,759

[45] Date of Patent: Feb. 27, 1996

[54] INK JET PRINTING MATERIAL

[75] Inventors: David R. Williams; William L. Quartz, both of Pulaski, N.Y.; Klaus B. Kasper, Boulder, Colo.; Dieter Becker, Georgsmarienhutte; Gerhard Dransmann, Osnabrück, both of Germany

[73] Assignee: Felix Schoeller jr. Foto-und Spezialpapiere GmbH & Co. KG, Osnabruck, Germany

[21] Appl. No.: 261,439

[22] Filed: Jun. 17, 1994

[30] Foreign Application Priority Data

Jul. 3, 1993 [DE] Germany .......................... 43 22 178.5

[51] Int. Cl.[6] ............................. B32B 23/08; B32B 27/10

[52] U.S. Cl. .......................... 428/514; 428/511; 428/522; 428/537.5; 503/201; 524/236; 524/503; 525/56; 525/57

[58] Field of Search .................................... 428/511, 500, 428/481, 537.5, 514, 522; 503/201; 525/56, 57; 524/236, 503

[56] References Cited

FOREIGN PATENT DOCUMENTS

| | | |
|---|---|---|
| 0379964 | 8/1990 | European Pat. Off. . |
| 0439153 | 7/1991 | European Pat. Off. . |
| 0487350 | 5/1992 | European Pat. Off. . |

OTHER PUBLICATIONS

Japanese Patent Publication 5–131 742A (Derwent Abstract No. 93–208648/26) Nov. 13, 1993.

*Primary Examiner*—D. S. Nakarani
*Attorney, Agent, or Firm*—Lockwood, Alex, Fitzgibbon & Cummings

[57] ABSTRACT

Ink jet printing materials comprise a support and an ink receiving layer containing a pigment, a hydrophilic binder comprising polyvinyl alcohol, vinylpyrrolidone homopolymer and/or vinylpyrrolidone copolymer, and a quaternary ammonium compound.

16 Claims, No Drawings

INK JET PRINTING MATERIAL

BACKGROUND, SUMMARY AND DESCRIPTION OF THE INVENTION

This invention relates to a printing material for the ink jet printing process and a coating compound for preparing an ink receiving layer for the material.

In ink jet printing systems printing operations are carried out by forming droplets of ink by means of various ink jet methods, such as electrostatic attraction methods, bubble formation processes, etc., and these droplets of ink are applied to a printing material. Such printing processes make it possible to print images with a very high resolution directly from electronic data. The image receiving materials used for this purpose must meet certain high requirements so that the image produced by the ink jet process will:

- have a high resolution;
- have a high color density;
- have sufficient color gradations;
- be smudgeproof; and
- be waterfast.

In order to satisfy these requirements or goals, the following basic conditions must be met:

- the ink must be rapidly absorbed by the printing material;
- the droplets of ink sprayed on the printing material must spread out in the most accurate possible manner in the shape of a circle and with precisely defined outlines;
- the ink diffusion in the printing material must not be too great so that the diameter of the ink spots does not increase any more than is absolutely necessary;
- when one ink spot overlaps with another ink spot which was previously applied, it should not have any negative effect or smear;
- the printing material must have a surface that permits a high visual reflection density and a high brilliance of the dyes; and
- the printing material should have a high dimensional stability and should not stretch after the printing process.

Some of these requirements are contradictory to each other. For example, if the material becomes smudgeproof too rapidly, there will be little or no spreading of the droplet of ink and, thus, the clarity of the resulting image is impaired. On the basis of the requirements of the printing material, there has been a search for ways to obtain an image with the highest possible ink density, while still being as smudgeproof as possible.

Papers in which the ink fluids can be absorbed in the spaces formed between the pulp fibers in the paper or between the fibers and filler have been used as the printing material for ink jet printing. Another group of printing materials include papers having a special ink receiving layer.

The ink receiving layers consist essentially of a pigment/binder mixture. In addition to increasing the whiteness of the printing material, the pigments serve the function of retention of the dyestuffs from the printing ink on the surface of the sheet. A high pigment concentration leads to a high porosity of the layer (German Patent No. 30 24 205). This makes the paper quite smudgeproof. However, at the same time the dyes are also drawn out of the ink into the interior of the printing material, and this has a negative effect on the color density of the image.

Japanese Patent JP 61-041585 discloses a method of producing printing material with a receiving layer of polyvinyl alcohol and polyvinylpyrrolidone. The mixing ratio of the two components PVA to PVP is 3:1 to 1:5. However, a disadvantage of this material is its inadequate waterfastness and wet rub off properties.

Japanese Patent JP 61-261089 discloses a transparent material for overhead projectors which contains a cationic conductive resin in addition to a mixture of polyvinyl alcohol and polyvinylpyrrolidone. This makes the paper smudgeproof and waterfast, but the wet rub off properties are not adequate.

Therefore, the object of the present invention is to provide a printing material for the ink jet printing process which will fulfill the requirements mentioned above, but specifically will assure a good waterfastness and wet rub off properties, in addition to a high color density and image definition or clarity.

This object is achieved by means of a printing material comprising a support and an ink receiving layer applied to the support and containing a polyvinyl alcohol, polyvinylpyrrolidone, a vinyl acetate homopolymer and/or a vinyl acetate copolymer, and a quaternary ammonium compound.

The weight ratio of the vinyl acetate homopolymer and/or vinyl acetate copolymer to the polyvinyl alcohol/polyvinylpyrrolidone mixture in the binder mixture is 1:3 to 3:1.

In a special embodiment of the invention, the vinyl acetate copolymer is a vinyl acetate/alkyl acrylate copolymer.

The amount of binder in the layer is 10 to 80 wt %, especially 30 to 60 wt % of the ink receiving layer.

The ink receiving layer contains a quaternary ammonium compound with a certain cationicity which is determined with PCD titration with a $1\times10^{-3}$ n solution of sodium polyethenesulfonate (PES solution). The cationicity obtained by this method for the ammonium compounds according to the invention is 15 to 30 ml PES solution, especially 20 to 25 ml PES solution. The quaternary ammonium compounds include, for example, polyamine salts and polyamidamine compounds. Polydiallyldimethylammonium chloride has proven to be especially advantageous.

The amount of quaternary ammonium compound in the layer does not exceed 10 wt % of the ink receiving layer.

The ink receiving layer according to the invention may also contain other additives such as white pigments, colored pigments, dyes, dispersants, wetting agents, curing agents and optical brighteners.

Examples of pigments that can be used in the ink receiving layer include silicic acid, clay, zeolites and other inorganic pigments. In a preferred embodiment of this invention, an amorphous silicic acid having a pore volume of about 1.0 to 2.5 ml/g and a particle size of $\leqq 5$ μm is used in the ink receiving layer. The amount of pigment in the ink receiving layer is 15 to 80 wt %, especially 30 to 65 wt % of the ink receiving layer.

The ink receiving layer is applied to the support from an aqueous dispersion with the help of any of the conventional methods of application and metered addition. The coating weight of ink receiving layer applied is 0.5 to 15 g/m$^2$, and preferably 2 to 8 g/m$^2$.

A plastic film or a coated or uncoated base paper may be used as the support. The base paper may be acidic or neutral sized paper. The back of the base paper may also have a hydrophilic layer containing a hydrophilic colloidal binder such as starch, modified starch, polyvinyl alcohol and/or gelatin.

The invention will be illustrated in greater detail in the following examples.

EXAMPLE 1

The front side of neutral sized raw paper having a basis weight of 80 g/m² and containing 20 wt % $CaCO_3$ in the pulp, and sized with a neutral alkylketene dimer size, was coated with an aqueous based coating compound and then dried. The resulting ink receiving layers had the following composition:

| | Composition, wt % | | | | | | |
|---|---|---|---|---|---|---|---|
| Components | 1a | 1b | 1c | 1d | 1e | 1f | 1g |
| Polyvinyl alcohol | | | | | | | |
| Degree of saponification: 98 mol % | 5.5 | 5.5 | — | — | — | — | — |
| Degree of saponification: 88 mol % | — | — | 5.5 | 5.5 | 10.0 | 5.5 | 5.5 |
| Polyvinylpyrrolidone Molecular weight: 630000 daltons | 5.5 | 5.5 | 5.5 | 5.5 | 10.0 | 5.5 | 5.5 |
| Vinyl acetate/butyl acrylate copolymer | 22.3 | 22.3 | 22.3 | 22.3 | 13.3 | 32.7 | 22.3 |
| Amorphous silicic acid | | | | | | | |
| A | 60.4 | 60.4 | 60.4 | — | 60.4 | 50.0 | 56.1 |
| B | — | — | — | 60.4 | — | — | — |
| Zinc oxide | 0.6 | 0.6 | 0.6 | 0.6 | 0.6 | 0.6 | 0.6 |
| Polyammonium salt with a cationicity of | | | | | | | |
| 21.58 ml PES solution* | 5.7 | 5.7 | 5.7 | — | 5.7 | 5.7 | 10.0 |
| 24.37 ml PES solution* | — | — | — | 5.7 | — | — | — |
| Amount applied, g/m² | 4 | 7 | 4 | 4 | 4 | 4 | 4 |

Where:
A is Particle size: 3.2 μm, pore volume 1.2 ml/g
B is Particle size: 3.0 μm, pore volume 1.8 ml/g
* is PES solution: $1 \times 10^{-3}$ n sodium polyethenesulfonate Other experimental conditions:

- Machine speed: 100 m/min
- Drying temperature: 130° C.
- Drying time: 5 minutes The resulting sheet material was printed in a thermal jet process and then analyzed.

The test results are summarized in Table 1.

Comparative Example V1

This example was carried out according to Example 1c. Instead of the polydimethyldiallyammonium chloride, an amide derivative with a cationicity of 13.11 ml PES solution was used.

Comparative Example V2

The base paper from Example 1 was provided with a receiving layer in which no polyvinyl acetate was used.

The ink receiving layers according to Comparative Examples V1 and V2 were applied from an aqueous medium and had the following compositions:

| | Composition, wt % | |
|---|---|---|
| Components | V1 | V2 |
| Polyvinyl alcohol, degree of saponification: 88 mol % | 5.5 | 16.0 |
| Polyvinylpyrrolidone, mol. wt. 630000 daltons | 5.5 | 16.0 |
| Vinyl acetate/butyl acrylate copolymer | 22.3 | — |
| Amorphous silicic acid A | 60.4 | 61.7 |
| Polyamidamine salt with a cationicity of 13.11 ml PES solution | 5.7 | — |
| Polydiallyldimethylammonium chloride | — | 5.7 |
| (see Ex. 1) Zinc oxide | 0.6 | 0.6 |
| Amount applied, g/m² | 4 | 4 |

The printing material obtained according to the comparative examples was printed in a thermal jet process and then analyzed. The results are summarized in Table 2.

In addition to the comparative examples, two commercial printing materials were also used and analyzed. The results are also summarized in Table 2.

Testing the Printing Material Obtained

According to the Examples and Comparative Examples

The printing material was printed with a Hewlett Packard HP Deskjet 550 C that operates according to the bubble jet principle (thermal jet).

The color density, definition, waterfastness and wet rub off properties were tested on the resulting print images.

The density measurements were performed with an Original Reflection Densitometer SOS-45. The measurements were performed for the primary colors cyan, magenta, yellow and black.

For determining the waterfastness of the paper, the printing material was immersed in water. The density (%) remaining after 60 seconds in the water bath is used as a measure of the water stability.

The image clarity (definition) is determined with a fiber counter. Field distances between a red field and a green field or between two black fields are determined (maximum value 1 mm). The colored fields composed of the primary colors have 200% ink coverage. Therefore, they serve as test fields for fixing large quantities of ink.

To determine the wet rub off properties, a 1 kg weight covered with a wet towel is passed five times over a test strip printed with 100% of black or cyan ink, and the density loss is evaluated (grades of 1 to 5, wherein grade 1 is very good and grade 5 is poor).

TABLE 1

Properties of the Printing Material Produced According to Example 1 and Then Printed

| | Color density | | | | Definition (field distance in mm) | Water fastness (cyan) | Wet rub off properties (cyan) |
|---|---|---|---|---|---|---|---|
| Example | Cyan | Magenta | Yellow | Black | Red/green | % | Grade |
| 1a | 1.95 | 1.35 | 1.52 | 2.22 | 0.9 | 93.0 | 1 |
| 1b | 1.91 | 1.32 | 1.44 | 2.19 | 1.0 | 95.0 | 1 |
| 1c | 1.93 | 1.34 | 1.50 | 2.20 | 0.9 | 93.5 | 1 |
| 1d | 1.98 | 1.36 | 1.48 | 2.18 | 0.9 | 93.0 | 1 |
| 1e | 2.01 | 1.40 | 1.50 | 2.22 | 0.8 | 94.0 | 2 |
| 1f | 1.99 | 1.35 | 1.45 | 2.16 | 0.8 | 93.0 | 1 |
| 1g | 1.94 | 1.44 | 1.56 | 2.20 | 0.9 | 97.0 | 1 |

TABLE 2

Properties of the Printing Material Produced According to Comparative Examples V1 and V2, and the Commercial Printing Material

| | Color density | | | | Definition (field distance in mm) | Water fastness (cyan) | Wet rub off properties (cyan) |
|---|---|---|---|---|---|---|---|
| Example | Cyan | Magenta | Yellow | Black | Red/green | % | Grade |
| V1 | 1.85 | 1.34 | 1.42 | 2.05 | 0.8 | 78.0 | 3 |
| V2 | 1.98 | 1.38 | 1.48 | 2.12 | 0.8 | 90.0 | 5 |
| Hp 51 630 % CK Jet Ser. | 1.75 | 1.27 | 1.26 | 2.07 | 0.8 | 88.0 | 5 |
| Canon LC101 | 1.65 | 1.21 | 1.26 | 1.79 | 0.8 | 92.0 | 5 |

We claim:

1. Ink jet printing material comprising a support, and an ink receiving layer containing (a) a pigment, (b) a hydrophilic binder comprising a mixture of polyvinyl alcohol, polyvinylpyrrolidone, and a vinyl acetate homopolymer and/or vinyl acetate alkyl acrylate copolymer, and (c) a quaternary ammonium compound.

2. The material of claim 1, wherein the quaternary ammonium compound is a polyammonium compound with a cationicity of about 15 to 30 ml of a $1\times10^{-3}$ n solution of sodium polyethylenesulfonate.

3. The material of claim 2, wherein the quaternary ammonium compound is a polydiallyldimethylammonium chloride.

4. The material of claim 2, wherein the amount of quaternary ammonium compound does not exceed about 10 wt % of the ink receiving layer.

5. The material of claim 1, wherein the quaternary ammonium compound is a polydiallyldimethylammonium chloride.

6. The material of claim 5, wherein the amount of quaternary ammonium compound does not exceed about 10 wt % of the ink receiving layer.

7. The material of claim 1, wherein the amount of quaternary ammonium compound does not exceed about 10 wt % of the ink receiving layer.

8. The material of claim 1, wherein the weight ratio of the vinyl acetate homopolymer and/or vinyl acetate alkyl acrylate copolymer to the polyvinyl alcohol/mixture polyvinylpyrrolidone is about 1:3 to 3:1.

9. The material of claim 8, wherein said weight ratio is about 1:1.5 to 3:1.

10. The material of claim 1, wherein the amount of binder is about 10 to 80 wt % of the ink receiving layer.

11. The material of claim 1, wherein the ink receiving layer includes a material selected from the group consisting of an amorphous silicic acid, a clay, a zeolite, and an inorganic pigment.

12. The material of claim 11, wherein the amorphous silicic acid has a pore volume of about 1.0 to 2.5 ml/g and a particle size of ≦5 μm.

13. The material of claim 1, wherein the amount of pigment in the ink receiving layer is about 15 to 80 wt % of the ink receiving layer.

14. The material of claim 13, wherein said amount of pigment is about 30 to 65 wt % of the ink receiving layer.

15. The material of claim 1, wherein said support is a sized raw paper.

16. The material of claim 1, wherein the amount by weight of polyvinyl alcohol does not exceed about 30 wt % of the binder.

* * * * *

UNITED STATES PATENT AND TRADEMARK OFFICE

CERTIFICATE OF CORRECTION

PATENT NO. : 5,494,759

DATED : February 27, 1996

INVENTOR(S) : David R. Williams, William L. Quartz, Klaus B. Kasper, Dieter Becker and Gerhard Dransmann It is certified that error appears in the above-indentified patent and that said Letters Patent is hereby corrected as shown below:

Col. 4, between lines 52-59, the title therebetween should be single spaced as : --Testing the Printing Material Obtained According to the Examples and Comparative Examples--.

Col. 5, TABLE 2, under the heading "Example," delete "CK" and insert --CX--.

Col. 6, line 61, delete "mixture"; line 62, before "is" insert --mixture--.

Signed and Sealed this

Twenty-second Day of October, 1996

*Attest:*

BRUCE LEHMAN

*Attesting Officer*

*Commissioner of Patents and Trademarks*